March 9, 1954 R. B. WOODBURY 2,671,897

AUTOMATICALLY SYNCHRONIZED LONG-RANGE NAVIGATION PULSE TRANSMITTER

Filed July 3, 1945 4 Sheets-Sheet 1

INVENTOR
ROGER B. WOODBURY

BY Ralph L Chappell
ATTORNEY

INVENTOR
ROGER B. WOODBURY
BY
Ralph L Chappell
ATTORNEY

March 9, 1954 R. B. WOODBURY 2,671,897

AUTOMATICALLY SYNCHRONIZED LONG-RANGE NAVIGATION PULSE TRANSMITTER

Filed July 3, 1945 4 Sheets-Sheet 3

INVENTOR

ROGER B. WOODBURY

BY Ralph L Chappell

ATTORNEY

INVENTOR
ROGER B. WOODBURY
BY
Ralph L. Chappell
ATTORNEY

Patented Mar. 9, 1954 2,671,897

UNITED STATES PATENT OFFICE 2,671,897

AUTOMATICALLY SYNCHRONIZED LONG RANGE NAVIGATION PULSE TRANSMITTER

Roger B. Woodbury, Boston, Mass., assignor, by mesne assignments, to the United States of America as represented by the Secretary of the Navy Application July 3, 1945, Serial No. 603,092

11 Claims. (Cl. 343—101)

This invention relates to a means for maintaining a recurrent series of pulse emissions from a radio transmitter in a known time relationship with a similar recurrent series of pulse emissions at the same recurrence frequency from a relatively distant radio transmitter.

As hereinafter described the invention functions principally as a means for maintaining a known time interval between the pulse emissions from a remote radio transmitter and those from a local transmitter, both of which are arranged to operate at the same pulse recurrence frequency. A simplified arrangement, however, is also shown for the purpose of illustrating the practicability of the invention as a means for holding the respective pulse signals in synchronism.

It is an object of this invention to provide a means for maintaining a known time relation between the pulse emissions from a local radio transmitter and those from a remote transmitter.

It is another object of this invention to provide a means for maintaining a known time interval between the reception of pulse emissions from a remote radio transmitter and those from a local transmitter.

It is another object of this invention to provide a means for causing the pulse emissions from a local radio transmitter to occur synchronously with those from a remote transmitter.

Other objects and features of the present invention will become apparent upon a careful consideration of the following detailed description when taken together with the accompanying drawings.

For purposes of illustration the invention will be shown and described as applicable for use in conjunction with the apparatus shown in the patent application of Jabez C. Street, John A. Pierce and Donald E. Kerr entitled "Long Range Navigation System," Serial No. 599,163 filed June 13, 1945. This system of navigation requires two land stations sending out pulsed, powerful, radio signals at different instants and at exactly the same rate. Further it requires that the time interval elapsing between the two said signals be very accurately held within one microsecond of some predetermined figure, which is here called, for sake of convenience, "time difference." For obvious reasons, the station assigned the responsibility for maintaining this "time difference" is called the "slave" and the other station of the pair is called the "master."

Figure 1:
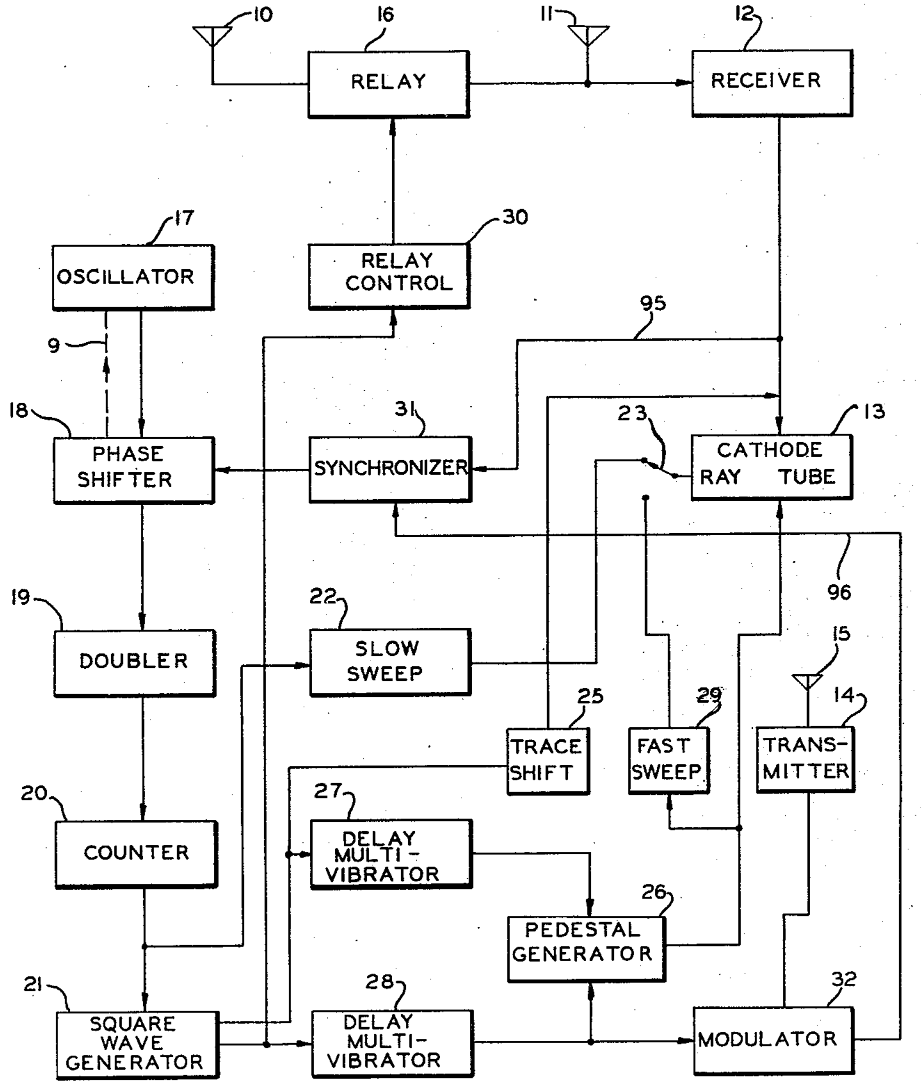
Fig. 1 is a block diagram showing a radio pulse timer and transmitter system in which the invention may be embodied.

Reference is now had in particular to Fig. 1 where the apparatus of this invention is represented in general by the block 31 labeled "synchronizer," and is shown embodied in the "slave" transmitter of the aforesaid navigation system. In operation, the distant pulse signal is picked up by a pair of antennas, 10 and 11, and fed to the input of a superheterodyne receiver 12 where the signal is detected, amplified, and applied vertically to a first horizontal sweep line on the cathode ray tube 13. Thereafter, the local transmitter 14 sends out a pulse from the antenna 15 which is received by the local antenna 11 alone, antenna 10 at this instant being shorted out by the operation of the relay 16, and is applied vertically through the receiver 12 to a second horizontal sweep on the cathode ray tube 13.

These sweeps are produced by the slow sweep generator 22, which is keyed by the counter circuit 20. The latter is arranged to produce suitable positive keying pulses at a frequency equal to twice the recurrence frequency at which it is desired to operate the transmitter 14, so that, each sweep produced on the cathode ray tube in response to these keying pulses is equal in duration to one half the time interval elapsing between the pulse signals emitted by the transmitter 14 and are arranged so that the second sweep is actually a repetition of the first sweep, except that it is displaced downward in a lower horizontal plane from the first sweep as will be described later. To control the production of these sweeps and also the operation of transmitter 14, as will be described hereinafter, the counter 20 is arranged to be driven by a 50 kc. oscillator 17 working through a phase shifter 18, a doubler and a locked blocking oscillator 19 which is tuned to operate at 100 kc. The oscillator 17 is preferably a crystal controlled type whose frequency is stabilized by disposing its crystal and certain other related radio frequency components in a constant temperature oven. The phase shifter 18 is of any known variety capable of producing, upon manual adjustment, 360° phase shift in the oscillator output, and is arranged, for instance, so as to key the first blocking oscillator at the very peaks of the positive half cycles of output therefrom. In this way, the phase shifter 18 may be adjusted to produce any conceivable phase shift in the blocking oscillator output $2\pi$ for example), and consequently a reduced phase shift in the pulse output from counter 20, depending upon the counting factor of the latter. Then if it is desired to operate the transmitter 14 at a rate of say 25 pulses per second, the output of the counter 20 will be set at 50 pulses per second, and will be fed in parallel to the slow sweep generator 22 and the square wave generator 21. The former is simply a saw-tooth voltage generator such as a non-conducting, gas-filled triode vacuum tube, having a plate load resistance and a charging condenser connected between its plate and cathode. Its output which is taken from the plate is coupled to the horizontal deflecting plates of the cathode ray tube 13. Thus, when a positive keying pulse from the counter is applied to the grid of the triode, the charging condenser first renders a rapid discharge through the tube and thereafter starts a gradual charge through the plate load resistance of the tube to thereby move the cathode ray tube beam slowly from left to right at such a rate that when the beam just reaches the right-hand edge of the cathode ray tube, a second keying pulse strikes the grid of the triode and a second beam sweep is started. Unless some means is provided for alternately changing the bias on the vertical deflecting plates of the cathode ray tube from one value to another during the production of the sweeps there will be no way of distinguishing the first sweep from the second. For this purpose, the square wave generator 21 is provided, which is simply a two tube Eccles-Jordan type of multivibrator. This multivibrator, as above mentioned, is also driven by the output of the counter 20 and produces on the plates of the opposite tubes thereof, a push-pull rectangular voltage wave output, having a frequency equal to one-half its keying frequency, with the half-cycles thereof equal in time duration to the cathode ray tube sweeps and synchronized therewith. The output taken from the plate of one of the tubes of the square wave generator 21 is then applied to the upper vertical deflecting plate of the cathode ray tube 13 through a trace shift circuit 25. The latter is any suitable means for regulating the amplitude of the rectangular voltage wave applied to the vertical deflecting plate, while the phase of the rectangular voltage applied thereto is such that as the counter output keys the sweep generator 22 to start the first sweep a positive voltage half cycle is applied to the upper vertical deflecting plate of the cathode ray tube 13, and a negative voltage wave is applied thereto during the production of the second sweep. Thus, it is seen that the first and second sweeps occur respectively in upper and lower horizontal planes.

To assist in the maintenance of the "time difference" in pulse emission, there is applied to each of the sweeps, a pedestal produced by the pedestal generator 26. The first occurs at a known and fixed time interval after the initiation of the first sweep and on which the distance pulse signal is to be displayed. The second occurs at a known but controllable time interval after the initiation of the second sweep and as will be seen hereafter controls the operation of the local transmitter 14. Thus, whenever, the pulse signals are positioned at corresponding points on the respective pedestals the relative positions of the latter, as observed from time markers on the sweeps on the cathode ray tube 13, will indicate the time difference in pulse emission.

To control the timing of the first pedestal, the same output voltage from the square wave generator 21 that is applied to the trace shift circuit 25 is also applied to the delay multivibrator 27 such that the leading edge of the positive half cycle therefrom which corresponds to the initiation of the first sweep, is differentiated by means not shown and applied as a keying pulse to the multivibrator 27. This multivibrator, which is preferably a known type of bias control multivibrator, produces a fixed time duration positive voltage pulse the trailing edge of which keys off the pedestal generator 26. Pedestal generator 26, which is also a known type of multivibrator, produces a fixed amplitude and time duration (about 100 microseconds) negative pulse which is applied to the top or first sweep through the lower vetrical deflecting plate of the cathode ray tube, at a time delayed from the initiation of the first sweep equal to the time duration of the positive pulse generated by the delay multivibrator 27. The phase opposed output taken from the plate of the other tube of the rectangular voltage wave generator 21 is applied to the delay multivibrator 28 such that the leading edge of the positive half cycle output therefrom, which corresponds in time to the initiation of the second sweep, is differentiated and applied as a keying pulse to the delay multivibrator 28. Delay multivibrator 28 is essentially two multivibrators in series, the first producing an adjustable step delay, and the second a variable delay permitting delay setting within the step intervals. Multivibrator 28 then produces a positive voltage pulse whose time duration is controlled, for example, by a time graduated potentiometer disposed in its circuit in a known manner. The trailing edge of this pulse keys off the pedestal generator 26 to produce a pedestal on the second beam sweep of the cathode ray tube 13, delayed in time from the initiation of the second sweep by an amount depending on the time duration of the pulse generated by the multivibrator 28. Similarly, the trailing edge of the output pulse from the delay multivibrator 28 is arranged to key the modulator 32 which forms a keying pulse of the proper time duration (usually about 9 to 20 microseconds) for setting the transmitter 14 into operation. Thus the pulse emitted by transmitter 14 will always appear on the second pedestal at a point near but not exactly at its leading edge since there will exist, for instance, a 10 or 15 microsecond cumulative delay in the transmitter and receiver circuits.

In operation, the position of the respective pedestals are first fixed at the proper points on their sweeps by relative adjustment of the multivibrators 27 and 28 and so as to simulate the desired time difference in pulse emissions. Thereafter the phase of the sweeps with reference to the distant signal is altered by adjustment of the phase shifter 18 until the distant pulse signal appears at a point on the first pedestal that corresponds to the position the controlled or local pulse signal occupies on the second pedestal. Then as set forth in the aforesaid patent applications, this time relation between the pulse emissions can be maintained by manual adjustment of the phase shifter 18.

For magnifying the traces where the pulses appear, a fast sweep generator 29 is provided. This is controlled by the leading and trailing edge of the pedestals to sweep only during the occurrence of these peedstals. A suitable switch 23 is provided to select the desired sweep.

Figure 2:
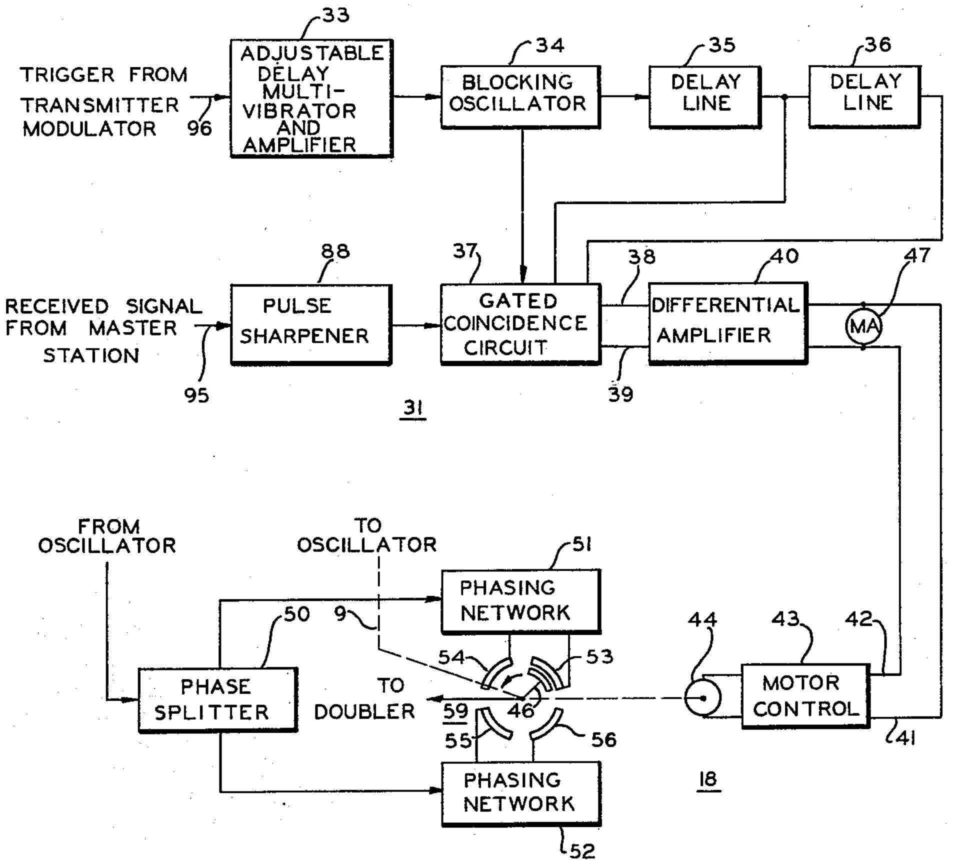
Fig. 2 is a block diagram showing integrally the component parts of the synchronizer according to the invention.

By the use of a synchronizer 31 in conjunction with phase shifter 18 the time relationship between the "master" and "slave" stations may be automatically maintained. The components of the synchronizer and phase shifter are shown in Fig. 2. A portion of the trigger pulse is withdrawn from modulator 32 and applied over lead 96 as a trigger to an adjustable delay multivibrator 33. The multivibrator is set to give the desired time delay and the trailing edge of its output wave is used to trigger a blocking oscillator 34. The output pulse of this blocking oscillator is of one microsecond duration and is impressed on two serially connected delay lines 35 and 36. Each of these lines has a delay value of one microsecond. The one microsecond output pulses of these lines, which occur at one and two microseconds respectively after the output pulse from blocking oscillator, are independently impressed on a gated coincidence circuit. This coincidence circuit is gated by the blocking oscillator pulse to charge certain condensers therein, and the potential of these condensers as modified by the other inputs to the coincidence circuit used to control subsequent circuit elements.

Figure 3:
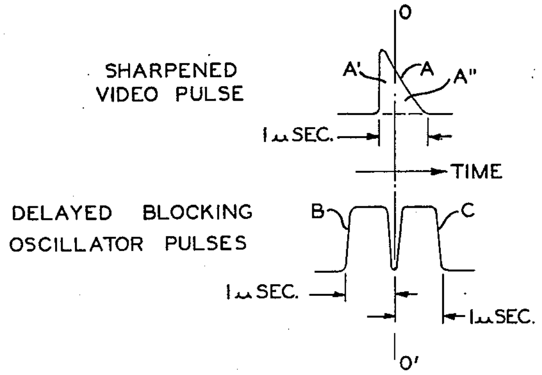
Fig. 3 is a diagram of certain wave forms arising in the system.

A portion of the video pulse of the "master" station is conducted from receiver 12 over path 95 and applied to pulse sharpener 88. Here the edges particularly the leading of the pulse of low slope are substantially eliminated to produce a sharply defined pulse of a duration of about one microsecond. This pulse is then impressed on gated coincidence circuit 37. In a manner to be later described in more detail, the coincidence circuit produces two output potentials which are equal when the line dividing the sharpened video pulse into equal areas coincides with the end of the one microsecond delayed pulse (or the beginning of the two microsecond delayed pulse). This may be seen from Fig. 3 to occur when the median O—O' which divides pulse A into equal areas A' and A'' coincides with the center of the depression between the one and two microsecond delayed pulses B and C, respectively. When the video pulse A so coincides in area with this depression, which occurs at the time of the adjacent ending and beginning of the pair of delayed pulses B and C, the output potentials at 38 and 39 of the coincidence circuit will be balanced, but when the pulse does not so coincide in area these outputs will be unbalanced. One output, say 38, will exceed the other 39 when the pulse leads the depression and be less when the peak lags the depression.

These output potentials control a differential amplifier 40 which feeds an error signal over leads 41 and 42 when the input in unbalanced to phase shifter 18, and specifically to a motor control 43 therein. This motor control feeds the input power to motor 44 in such a manner that the motor rotates in one direction when the voltage in one of the leads, say 41, exceeds that in the other lead 42 and rotates in the other direction when the voltage in lead 41 is less than that in lead 42, the speed of rotation depending on the degree of voltage unbalance in the two leads. The armature of motor 44 is mechanically linked to the rotatable plate 46 of a phase shifting capacitor 59, which plate rotates at a speed and in a direction corresponding to that of the armature. A zero center milliammeter 47 is connected across the output of differential amplifier 40. The amount and direction of its deflection will then be a measure of the time difference between the median of video pulse A and the depression between blocking oscillator pulses B and C, if the circuit is initially balanced.

The output of oscillator 17, which is the timing wave of the "slave" station is fed to phase splitter 50 in phase shifter 18. The outputs of phase splitter 50 are fed in 180 degree relationship to two phasing networks 51 and 52 whose outputs are applied in quadrature relationship to the four stator plates 53, 54, 55 and 56 of phase shifting capacitor 59. The output, the phase of which depends on the angular position of rotor plate 46 with respect to the stator plates is then fed to doubler 19. It is apparent that the phase will be shifted $2\pi$ radians for every complete revolution of the rotor plate, and the frequency of the output of oscillator 17 will be changed by an amount corresponding to the rate of rotation of plate 46. An oscillator frequency control is mechanically coupled to the phase shifter shaft so as to alter the frequency of oscillator 17 proportionately to the total rotation of the phase shifter. This is to correct for large errors in frequency and to prevent continued drift of the signal in the same direction. This altering or pulling is effected by a variable condenser in the oscillator circuit whose adjustment is dependent as set forth on the rotation of the phase shifter shaft. It is now apparent that as long as the median of video pulse A occurs synchronously with the depression between blocking oscillator pulses B and C the frequency output of oscillator 17 will not be altered, and this output will be impressed on doubler 19 with frequency unchanged. However, if this median and depression deviate from synchronism, the error signal then produced causes motor 44 to rotate plate 46 at a rate sufficient to change the frequency of the energy applied to doubler 19 by an amount necessary to cause the median and depression to return to synchronism.

Figure 4:
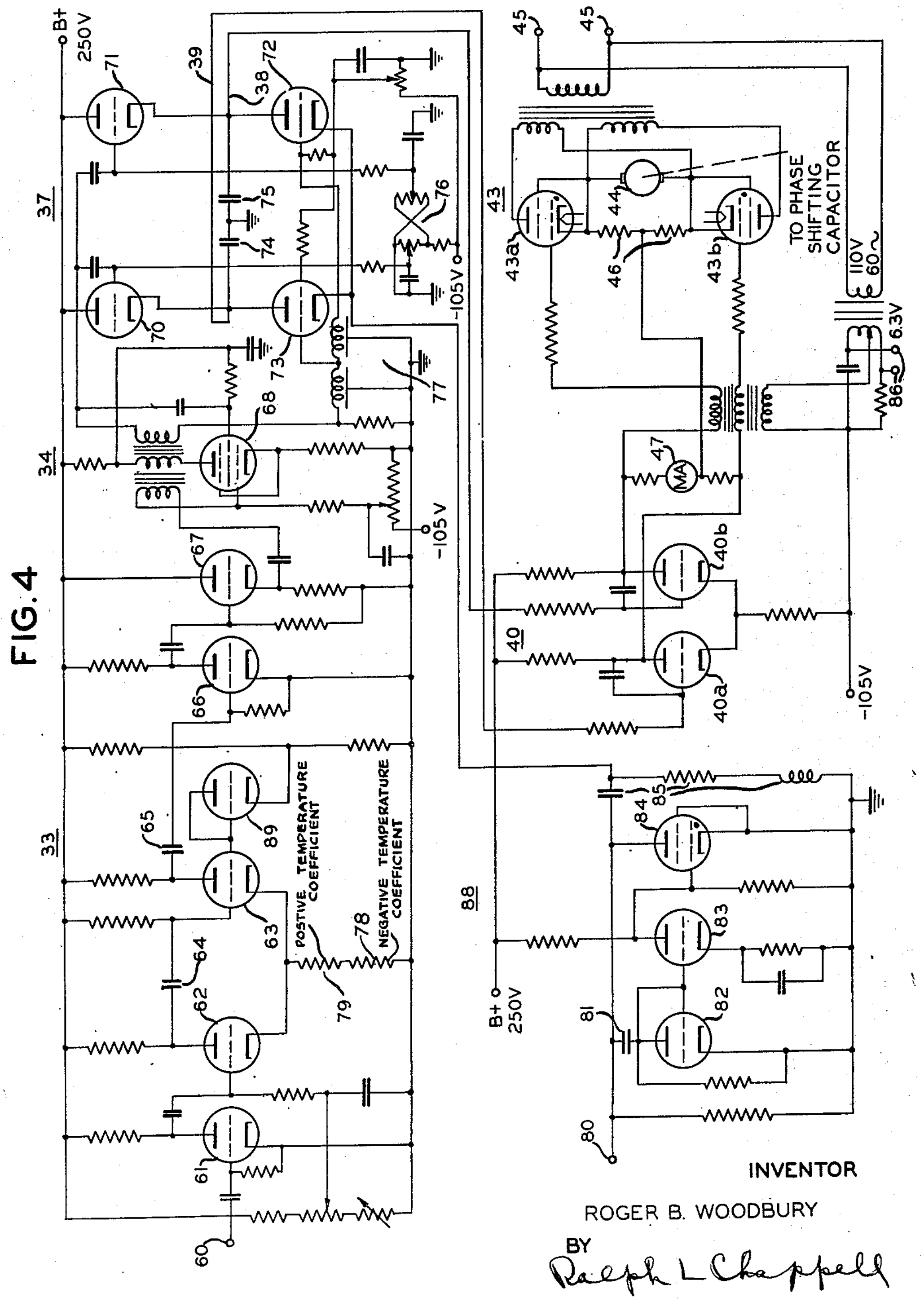
Figs. 4 and 5 are circuit diagrams of the components of Fig. 2.

Referring now to Fig. 4 where there is generally disclosed a circuit diagram of the arrangement of Fig. 2. A portion of the trigger pulse from the modulator is applied at terminal 60 as a negative pulse to the grid of amplifier tube 61. The positive output of tube 61 is used to trigger tubes 62 and 63 of the multivibrator. This multivibrator provides a very accurate and adjustable delay. It is described in detail in patent application, Ser. No. 512,931, filed December 4, 1943, now Patent No. 2,562,660, issued July 31, 1951, of Britton Chance. It is sufficient to point out here that tube 62 is normally biased beyond cut off by the associated resistors and voltages, and tube 63 is normally conducting plate current therethrough. Tube 62 when triggered by the output of amplifier tube 61 becomes conducting of plate current. This biases the grid of tube 63 beyond cut off, since this grid is connected to the plate of tube 62 through condenser 64. A positive pulse is then produced at the plate of tube 63 of a duration equal to the time required by the grid of tube 63 to return to cut off, as condenser 64 charges. The conventional grid to cathode resistor is lacking in tube 63. Hence the voltage on the grid of tube 63 as condenser 64 charges will approach the value of the plate voltage as a limit rather than a value slightly in excess of cathode voltage as in conventional multivibrators. This gives a much sharper approach to the cut off voltage, where the switching action occurs, and hence a more exact termination of the positive pulse appearing at the plate of tube 63. Tube 89 may be added to still further improve the accuracy of the multivibrator by preventing the flow of grid current in tube 63. To improve further the accuracy of this multivibrator by reducing the effect of temperature changes resistor 79 is of a material having a positive temperature coefficient and resistor 78, in series with resistor 79, is of a material having a negative temperature coefficient.

The multivibrator output is applied to the grid of tube 66 through peaking condenser 65. Thus positive and negative pips occur at the beginning and end, respectively, of the rectangular wave produced by the multivibrator. Tube 66 is normally conducting plate current, and a positive pip will have no appreciable effect on tube 66, but a negative pip will cut tube 66 off during its occurrence to provide a positive pulse at the plate of this tube. This positive pulse is passed through a cathode follower tube 67, and used as a trigger for blocking oscillator tube 68.

Digressing now to consider the action of pulse sharpener circuit 33 the video pulse of the "master" station is impressed on terminal 80 from receiver 12. This pulse has a duration in practice of about 70 microseconds. In order to have this pulse in a useful form considerable sharpening is necessary, that is, it is necessary to eliminate thel ong leading and trailing edges. Sharpening this pulse to a duration of about one microsecond has been found satisfactory. When the pulse appears at terminal 80 it finds condenser 81 in a discharged condition. During the time of rise, that is the leading edge, of the pulse this condenser is charged through tube 82 acting as a rectifier. During this rise of the pulse the grid of tube 83 is held at ground by rectifier tube 82. The voltage at 80 will be only slightly modified by this as the peak pulse voltage appears across condenser 81. When the pulse begins to fall the grid voltage of tube 83 also begins to fall as tube 82 no longer conducts. This increases the voltage at the plate of tube 83 and on the grid of gas thyratron 84. This increased grid voltage on tube 84 in conjunction with an increased plate voltage thereon as the video pulse just passes its peak, triggers thyratron 84 to provide a low resistance path from plate to ground for discharge of the output condenser of the receiver (not shown) which is coupled to terminal 80. This gives an extremely sharp fall to the video pulse. This pulse is then differentiated by the R, L, and C circuit at 85 giving a negative one microsecond pulse at the time the thyratron fires.

Gated coincidence circuit 37 comprises gate tubes 70 and 71 and pulse stretching tubes 72 and 73. The output pulse from blocking oscillator 34 is applied positively to the grids of tubes 70 and 71 to render these tubes conducting and thereby charge condensers 74 and 75. The one and two microsecond delayed pulses from delay line 77 are impressed on the grids of stretcher tubes 73 and 72, respectively, and at the occurrence of these pulses condensers 74 and 75 will be partially discharged if the video pulse occurs at this time, the resistance of the charging path being less than the discharging. The sharpened video pulse is impressed on the cathode of each of tubes 72 and 73. When properly synchronized the leading area A′ occurs synchronously with the one microsecond delayed pulse and the trailing area A′′ occurs synchronously with the two microsecond delayed pulse. This will reduce equally the amount of charge on condensers 74 and 75. When the system deviates from synchronism the video pulse will overlap one of the delayed pulses more than the other. For example, in the case where the median O—O′ of video pulse A is leading the depression between delayed pulses B and C referring to Fig. 3, pulse A will overlap pulse B more than pulse C. Accordingly, condenser 74 is discharged less than condenser 75 with a resulting higher voltage level on output lead 39 than one 38. On returning to synchronism the voltage levels on 38 and 39 will once more become equal. If the median O—O′ of video pulse A lags the de pression between delayed pulses B and C the higher voltage level will obviously be on output lead 38. A variable resistance network 76 is provided to manually equalize the outputs when the video and delayed pulses are in synchronism. The equalization occurs when milliammeter 47 reads zero. It should be noted that the charge on condensers 74 and 75 after the end of the two microsecond delay pulse remains substantially unchanged until the occurrence of the next blocking oscillator pulse.

The outputs on 38 and 39 are applied to the grids of differential amplifier tubes 40*a* and 40*b* to provide an output at the plates corresponding inversely in unbalance to that impressed on the grids. This plate output is used to determine the steady state bias of the grids of thyratron tubes 43*a* and 43*b*. The 110 volt 60 cycle alternating voltage to drive motor 44 is applied at terminals 45. Thyratron tubes 43*a* and 43*b* act as rectifiers to produce a direct current through resistor 46. This furnishes a direct voltage to motor 44. The direction and speed of rotation of motor 44 will depend on the direction and amount of current passing through resistor 46. When the direct voltage applied to the grid of one thyratron, say 43*a*, is higher than that applied to the other this tube 43*a* will be triggered earlier in the half cycle which it conducts. Hence more current will tend to flow through resistor 46 due to this tube than due to tube 43*b*, with a resulting effective direct current flow from the cathode of tube 43*a* to the cathode of tube 43*b* through resistor 46. This produces a voltage across resistor 46 to drive motor 44 in one of its directions of rotation. The beaters of thyratrons 43*a* and 43*b* are energized by the 6.3 volts at terminals 86.

Figure 5:
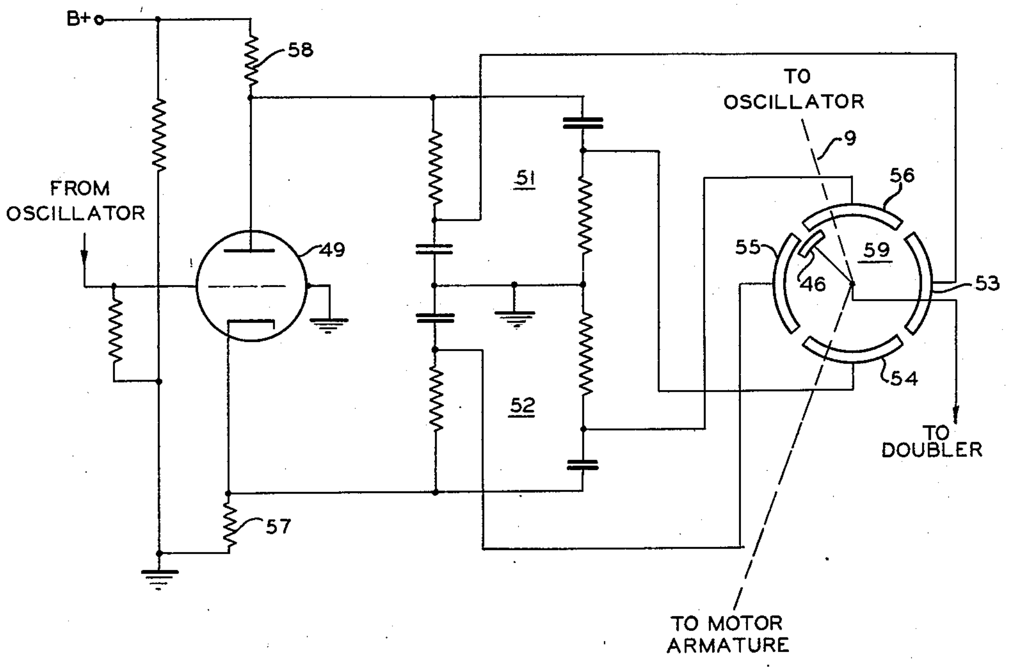

Referring now to Fig. 5 where the phase shifter 18 of Fig. 1 is shown in detail. The output of oscillator 17 is impressed on the grid of phase splitting tube 49. The voltages are taken from cathode resistor 57 and plate resistor 58 in 180° phase opposition and applied to phase shifting networks 52 and 51 respectively. These consist of resistance and capacity networks as shown and produce each two voltage outputs in quadrature. These outputs are applied to fixed plates 53, 54, 55 and 56 of phase shifting capacitor 59, the voltages on adjacent plates at any instant of time being in 90 degree phase relationship and the voltages on oppositely disposed plates being in 180 degree phase relationship. The phase of the output to the doubler will vary substantially linearly with rotation of rotor plate 46.

Numerous additional applications and modifications of the above disclosed principles will occur to those skilled in the art and no attempt has been made here to exhaust such possibilities. The scope of the invention is defined in the following claims.

I claim:

1. A means for maintaining a recurrent series of pulse emissions from a first radio pulse transmitter in a known time relation with a similar series of pulse emissions from a second transmitter comprising, means for generating a timing wave, means for controlling the pulse emissions of said second transmitter in response to said timing wave, means for producing in response to the pulse emission from said second transmitter a pair of pulses in adjacent time relationship and delayed in time a controllable amount from the corresponding pulse, and means for controlling the frequency of said timing wave in response to the deviation from synchronism of the time of the adjacent ending and beginning of said pair of pulses from the median of the corresponding pulse of the emission of said first transmitter in such a direction as to restore synchronism between said median and said time.

2. A means for maintaining a recurrent series of pulse emissions from a first radio pulse transmitter in a known time relation with a similar recurrent series of pulse emissions from a second transmitter comprising, means for generating a timing wave, means for controlling the pulse emissions of said second transmitter in response to said timing wave, means for producing in response to the pulse emission from said second transmitter a pair of pulses in adjacent time relationship and delayed in time controllable amounts from the corresponding pulse, means for receiving the pulse emissions from said first transmitter, means for sharpening said last mentioned pulse emission to a pulse width comparable with the duration of said adjacent pair of pulses, and means for varying the frequency of said timing wave in response to the deviation from synchronism of the median of said sharpened pulse from the time of the adjacent ending and beginning of said pair of pulses in such a direction as to restore synchronism between said median and said time.

3. A means for maintaining a recurrent series of pulse emissions from a first radio pulse transmitter in a known time relation with a similar recurrent series of pulse emissions from a second transmitter comprising, means for generating a timing wave, means for controlling the pulse emissions from said second transmitter in response to said timing wave, means for producing a pulse in response to each pulse emission from said second transmitter and delayed by a fixed time from its corresponding pulse emission, means for further delaying said pulse by definite and different time intervals to produce a pair of pulses the later pulse of said pair beginning at the end of the earlier pulse of said pair, means for receiving the pulse emissions from said first transmitter, means for sharpening said last mentioned pulse emissions to a pulse width comparable with the duration of said two delayed pulses, means for producing two voltages of equal magnitude when the median of each sharpened pulse is synchronous with the time of the adjacent ending and beginning of said pair of pulses and of unequal magnitude in an amount depending on the deviation of the median of said sharpened pulse from said time, means for varying the frequency of said timing wave and so responsive to the unbalance of said two voltages as to cause the median of said sharpened pulse to remain substantially synchronous with said time.

4. A means for maintaining a recurrent series of pulse emissions from a first radio pulse transmitter in a known time relation with a similar series of pulse emissions from a second radio pulse transmitter comprising, means for generating a first timing wave, means for continuously shifting the phase of said first timing wave for obtaining a second timing wave differing in frequency from said first timing wave by an amount dependent upon the rate at which the phase of said first timing wave is continuously shifted, means responsive to said second timing wave for controlling the pulse emissions from said second transmitter, means for producing in response to each pulse emission from said second transmitter a pair of pulses in adjacent time relationship and delayed in time by controllable amounts from the corresponding pulse, means for receiving the pulse emissions from said first transmitter, means for sharpening each of said last-mentioned pulses to a pulse width comparable with the duration of said adjacent pair of pulses, said phase shifting means being responsive to said first timing wave and to the deviation from synchronism of the median of said sharpened pulse from the ending and beginning, respectively, of said pair of pulses for continuously shifting the phase of said first timing wave at a rate dependent upon the magnitude of said deviation whereby the frequency of said second timing wave is altered in a direction to reduce said deviation to a minimum, and means also responsive to said deviation from synchronism for altering the frequency of oscillation of said first timing wave in a direction to restore synchronism between said median of said sharpened pulse and said ending and beginning, respectively, of said pair of pulses, thereby reducing said deviation to zero.

5. A means for maintaining a recurrent series of pulse emissions from a first radio pulse transmitter in a known time relation with a similar recurrent series of pulse emissions from a second transmitter comprising, means for generating a first timing wave, means for controlling the pulse emissions from said second transmitter in response to said first timing wave, means for producing a pulse in response to each pulse emission from said second transmitter, means for delaying said pulse, means for further delaying said pulse by definite and different time intervals to produce a pair of pulses, the later pulse of said pair beginning at the end of the earlier pulse of said pair, means for receiving the pulse emissions from said first transmitter, means for sharpening each of said last-mentioned pulse emissions to a pulse width comparable with the duration of said two delayed pulses, means for producing two voltages that are equal in magnitude when the median of each sharpened pulse is synchronous with the time of the adjacent ending and beginning of said pair of pulses and that differ in magnitude when said median of said sharpened pulse deviates from said time, the magnitude of said difference depending upon the magnitude of said deviation, a differential amplifier controlled by said two voltages for producing an error signal between two terminals, a motor responsive to said error signal and adapted to rotate at a speed proportional to the magnitude of said error signal and in a direction depending upon which of said terminals is at a higher potential, a phase shifting capacitor comprising a rotatable plate and four stator plates, said rotatable plate being mechanically linked for rotation to said motor, a phase splitter circuit, means for coupling the output of said timing wave to the input of said phase splitter circuit, means for abstracting from said phase splitter circuit two outputs in 180° relationship, one of said outputs being in phase with said timing wave, a phasing network for each output of said phase splitter circuit, means for applying the outputs of said phasing networks in quadrature relationship to said four stator plates, whereby said timing wave appears at said rotatable plate phase-shifted by an amount depending upon the position of said rotatable plate relative to said four stator plates and the phase of the pulse emissions of said second transmitter is correspondingly changed in a direction to reduce said deviation, frequency control means associated with said timing wave generator means and mechanically coupled to said rotatable plate for altering the frequency of said timing wave proportionately to the total rotation of said rotatable plate and in a direction to cause said error signal at the output of said differential amplifier to be decreased to zero.

6. Apparatus for maintaining a recurrent series of pulse emissions from a first radio pulse transmitter in a known time relation with a similar recurrent series of pulse emissions from a second radio pulse transmitter comprising, means for generating a first timing wave, means for controlling the pulse emissions from said second transmitter in response to said first timing wave, means for producing a pulse in response to each pulse emission from said second transmitter, means for delaying said pulse, means for further delaying said pulse by definite and different time intervals to produce a pair of pulses, the later pulse of said pair beginning at the end of the earlier pulse of said pair, means for receiving the pulse emissions from said first transmitter, means for sharpening each of said last-mentioned pulse emissions to a pulse width comparable with the duration of said two delayed pulses, means responsive to said sharpened pulses, said pulses from said second transmitter and said delayed pulses for producing two voltages that are equal in magnitude when the median of each sharpened pulse is synchronous with the time of the adjacent ending and beginning of said pair of pulses and that differ in magnitude when said median of said sharpened pulse deviates from said time, the magnitude of said difference depending upon the magnitude of said deviation, said last-mentioned means comprising, first and second pairs of electron tubes, each tube having at least an anode, a control grid and a cathode, means coupling said pulses from said second transmitter to the cathode of each of said second pair of tubes, a first pair of capacitors for separately coupling said sharpened pulses to the grids of said tubes of said first pair, means coupling the first of each pair of said delayed pulses to the grid of one of said tubes of said second pair, means for coupling the second of each pair of said delayed pulses to the grid of the other tube of said second pair, a source of positive supply potential coupled to each of the anodes of the tubes of said first pair, a second pair of capacitors, one plate of each of said second pair of capacitors being returned to a point of reference potential, the other plate of one of said second pair of capacitors being connected to the cathode of one of said first pair of tubes and to the anode of one of said second pair of tubes, the other plate of the other of said second pair of capacitors being connected to the cathode of the other of said first pair of said tubes and to the anode of the other of said second pair of tubes, said two voltages appearing at said other plates of said second pair of capacitors, a differential amplifier controlled by said two voltages for producing an error signal between two terminals, a motor responsive to said error signal and adapted to rotate at a speed proportional to the magnitude of said error signal and in a direction depending upon which of said terminals is at a higher potential, a phase shifting capacitor comprising a rotatable plate and four stator plates, said rotatable plate being mechanically linked for rotation with said motor, a phase splitter circuit, means for coupling the output of said timing wave to the input of said phase splitter circuit, means for abstracting from said phase splitter circuit two outputs in 180° relationship, one of said outputs being in phase with said timing wave, a phasing network for each output of said phase splitter circuit, means for applying the outputs of said phasing networks in quadrature relationship to said four stator plates, whereby said timing wave appears at said rotatable plate phase-shifted by an amount depending upon the position of said rotatable plate relative to said four stator plates and the phase of the pulse emissions of said second transmitter is correspondingly changed in a direction to reduce said deviation, frequency control means associated with said timing wave generator means and mechanically coupled to said rotatable plate for altering the frequency of said timing wave proportionately to the total rotation of said rotatable plate and in a direction to cause said error signal at the output of said differential amplifier to be decreased to zero.

7. Electrical apparatus comprising, means for generating first and second series of spaced pulses at substantially the same pulse repetition rate, means responsive to each of said first pulses for producing a pair of pulses in adjacent time relationship and delayed in time from said first pulse by a controllable amount, means for sharpening each of said second series of pulses to a pulse width comparable with the duration of said adjacent pair of delayed pulses, and means responsive to said first series of pulses, said delayed pulses and said sharpened pulses for producing two signals that are equal in amplitude when the median of each sharpened pulse is synchronous with the time of the adjacent ending and beginning of a pair of said delayed pulses and that differ in magnitude when said median of said sharpened pulse deviates from said time, the magnitude of said difference depending upon the magnitude of said deviation.

8. Electrical apparatus comprising, means for generating first and second series of spaced pulses at substantially the same pulse repetition rate, means responsive to each of said first pulses for producing a pair of pulses in adjacent time relationship and delayed in time from said first pulse by a controllable amount, means for sharpening each of said second series of pulses to a pulse width comparable with the duration of said adjacent pair of delayed pulses, and means responsive to said first series of pulses, said delayed pulses and said sharpened pulses for producing two signals that are equal in amplitude when the median of each sharpened pulse is synchronous with the adjacent ending and beginning of a pair of said delayed pulses and that differ in magnitude when said median of said sharpened pulse deviates from said time, the magnitude of said difference depending upon the magnitude of said deviation, said last-mentioned means comprising, first and second pairs of electron tubes, each tube having at least an anode, a control grid and a cathode, means coupling said second series of pulses to each cathode of said second pair of tubes, means for coupling said sharpened pulses to the grids of said tubes of said first pair, means coupling the first of each pair of said adjacent delayed pulses to the grid of one of said tubes of said second pair, means coupling the second of each pair of said adjacent delayed pulses to the grid of the other of said tubes of said second pair, a source of positive supply potential coupled to each of the anodes of the tubes of said first pair, and a pair of capacitors, one plate of each being returned to a point of reference potential, the other plate of one of said pair of capacitors being connected to the cathode of one of said first pair of tubes and to the anode of one of said second pair of tubes, the other plate of the other of said pair of capacitors being connected to the cathode of the other of said first pair of tubes and to the anode of the other of said second pair of tubes, said two voltages appearing at said other plates of said second pair of capacitors.

9. Apparatus for maintaining a known time relation between first and second similar recurrent series of pulses comprising, means for generating a timing wave, means responsive to said timing wave for generating said second series of pulses, means responsive to each pulse of said second series for producing a pair of adjacent pulses each delayed in time a different and controllable amount from said pulse of the second series, the later pulse of said pair beginning at a time adjacent to the end of the earlier pulse thereof, means for shaping the pulses of said first series to have a pulse width comparable with the duration of said pair of pulses, means for producing two voltages of equal magnitude when the median of each shaped pulse is synchronous with said adjacent ending and beginning of said pair of pulses and said voltages being of unequal magnitude in an amount depending on the deviation of the median of said shaped pulse from said time, and means for varying the frequency of said timing wave being so responsive to the unbalance of said two voltages as to cause the median of said shaped pulse to remain substantially synchronous with said time.

10. Apparatus for maintaining a known time relation between first and second series of pulses having substantially the same repetition rate comprising, means for generating a timing wave, means responsive to said timing wave for generating said second series of pulses, means responsive to each pulse of said second series for producing a pair of pulses each delayed in time by a different and controlled amount, the later pulse thereof beginning at a time adjacent to the end of the earlier pulse thereof, means for shaping each pulse of said first series to have a pulse width comparable with the duration of said pair of pulses, means responsive to said second series of pulses, said delayed pulses and said shaped pulses for producing two voltages of equal magnitude when the median of each shaped pulse is synchronous with said adjacent end and beginning of the pulses of said pair, said voltages being of unequal magnitude in an amount depending on the deviation of the median of said shaped pulse from said time, and means responsive to said two voltages arranged to control the frequency of said timing wave so as to maintain the median of said shaped pulse in synchronism with said time.

11. Apparatus for maintaining a known time relation between first and second similar series of pulses having the same repetition rate comprising, means for generating a timing wave, means responsive to said timing wave for generating said second series of pulses, means responsive to each pulse of said second series for producing a pair of adjacent pulses each delayed in time by a different and controlled amount, the later pulse thereof beginning at a time adjacent to the end of the earlier pulse thereof, means for sharpening each pulse of said first series to have a pulse width comparable to the duration of said pair of pulses, means for producing two voltages of equal magnitude when the median of each sharpened pulse is synchronous with said adjacent end and beginning of the pulses of said pair, said voltages being of unequal magnitude in an amount depending on the deviation of the median of said shaped pulse and said time, and electromechanical phase shifting apparatus responsive to said two voltages and said timing wave arranged to alter the frequency of said timing wave so as to maintain the median of said shaped pulse in synchronism with said time.

ROGER B. WOODBURY.

References Cited in the file of this patent

UNITED STATES PATENTS

| Number | Name | Date |
|---|---|---|
| 1,788,073 | Wolf | Jan. 6, 1931 |
| 2,057,773 | Finch | Oct. 20, 1936 |
| 2,085,424 | Goddard | June 29, 1937 |
| 2,106,806 | Latimer et al. | Feb. 1, 1938 |
| 2,173,902 | Gerth et al. | Sept. 26, 1939 |
| 2,201,978 | Bedford | May 28, 1940 |
| 2,209,507 | Campbell | July 30, 1940 |
| 2,425,314 | Hansell | Aug. 12, 1947 |
| 2,449,174 | O'Brien | Sept. 14, 1948 |
| 2,470,464 | Bowie | May 17, 1949 |
| 2,531,919 | O'Brien | Nov. 28, 1950 |